US009448557B2

United States Patent
Maalioune

(10) Patent No.: US 9,448,557 B2
(45) Date of Patent: Sep. 20, 2016

(54) METHOD AND SYSTEM FOR CONTROLLING AT LEAST ONE ACTUATOR OF THE COWLINGS OF A TURBOJET ENGINE THRUST INVERTER

(75) Inventor: Hakim Maalioune, Orgeval (FR)

(73) Assignee: SAFRAN NACELLES, Gonfreville L'Orcher (FR)

(*) Notice: Subject to any disclaimer, the term of this patent is extended or adjusted under 35 U.S.C. 154(b) by 1128 days.

(21) Appl. No.: 12/673,778

(22) PCT Filed: Jul. 7, 2008

(86) PCT No.: PCT/FR2008/000976
§ 371 (c)(1),
(2), (4) Date: Feb. 17, 2010

(87) PCT Pub. No.: WO2009/034245
PCT Pub. Date: Mar. 19, 2009

(65) Prior Publication Data
US 2011/0016846 A1 Jan. 27, 2011

(51) Int. Cl.
*F02K 1/76* (2006.01)
*G05B 23/02* (2006.01)
*G05B 9/02* (2006.01)

(52) U.S. Cl.
CPC .......... *G05B 23/0291* (2013.01); *F02K 1/763* (2013.01); *G05B 9/02* (2013.01); *F05D 2270/094* (2013.01); *G05B 2219/42329* (2013.01); *Y02T 50/671* (2013.01)

(58) Field of Classification Search
CPC .............. F02K 1/64; F02K 1/68; F02K 1/70; F02K 1/72; F02K 1/74; F02K 1/76; F02K 1/763; F02K 1/766
USPC ........... 60/226.2, 226.3, 230, 771, 232, 223, 60/39.091, 779; 239/265.19, 265.23, 239/265.25, 265.27, 265.29, 265.31, 239/265.33, 265.35, 265.39, 265.43; 244/110 B; 701/3, 29.2, 100; 702/1, 33, 702/34, 127, 182, 183, 184, 185; 73/865.8, 73/865.9
See application file for complete search history.

(56) References Cited

U.S. PATENT DOCUMENTS 3,688,989 A * 9/1972 McMurtry et al. ...... 239/265.29
3,754,708 A * 8/1973 Britt et al. ............... 239/265.29
(Continued)

FOREIGN PATENT DOCUMENTS

| EP | 0843089 A1 | 5/1998 |
| EP | 1413735 A1 | 4/2004 |
| FR | 2872223 A1 | 12/2005 |

OTHER PUBLICATIONS

International Search Report PCT/FR2008/000976; Dated Feb. 18, 2009.

*Primary Examiner* — Phutthiwat Wongwian
*Assistant Examiner* — Marc Amar
(74) *Attorney, Agent, or Firm* — Burris Law, PLLC

(57) ABSTRACT

The invention relates to a control system for at least one actuator (6) for the cowlings of a thrust inverter in a turbojet engine, that comprises an assembly of actuation and/or control components. A control means (9) is provided for detecting the failure of an actuation and/or control component (7, 16, 13), for determining the blocking or non-blocking character of the failure for the system operation and, in case of a non-blocking failure, for switching from a nominal operation mode to a failure-adaptation operation mode in which the failure of the actuation and/or control component (7, 16, 13) is compensated at least partially by a modified instruction of the other actuation and/or control components (7, 16, 13).

6 Claims, 3 Drawing Sheets

(56) References Cited

U.S. PATENT DOCUMENTS

| | | | | |
|---|---|---|---|---|
| 3,774,868 | A * | 11/1973 | Goetz | 244/53 R |
| 4,422,605 | A * | 12/1983 | Fage | 244/110 B |
| 5,206,810 | A * | 4/1993 | Bools et al. | 701/100 |
| 5,495,710 | A * | 3/1996 | Servanty | 60/226.2 |
| 5,547,130 | A * | 8/1996 | Davies | 239/265.29 |
| 5,897,596 | A * | 4/1999 | Kabune et al. | 701/29.2 |
| 5,960,626 | A * | 10/1999 | Baudu et al. | 60/226.2 |
| 6,860,712 | B2 * | 3/2005 | Pisano et al. | 415/17 |
| 7,278,257 | B2 * | 10/2007 | Colotte et al. | 60/226.2 |
| 8,907,595 | B2 * | 12/2014 | Weibel et al. | 318/3 |
| 8,931,253 | B2 * | 1/2015 | Baudu et al. | 60/226.2 |
| 8,939,401 | B2 * | 1/2015 | Pereira et al. | 244/110 B |
| 8,943,794 | B2 * | 2/2015 | Moradell-Casellas et al. | 60/226.2 |
| 8,955,305 | B2 * | 2/2015 | Marin Martinod et al. | 60/226.2 |
| 8,955,306 | B2 * | 2/2015 | Maalioune et al. | 60/226.2 |
| 8,975,911 | B2 * | 3/2015 | Maalioune | 324/765.01 |
| 2005/0114090 | A1 | 5/2005 | Black | |
| 2006/0125433 | A1 | 6/2006 | Kamen | |
| 2009/0064655 | A1 * | 3/2009 | Regunath | 60/39.091 |
| 2010/0017049 | A1 * | 1/2010 | Swearingen et al. | 701/3 |

* cited by examiner

METHOD AND SYSTEM FOR CONTROLLING AT LEAST ONE ACTUATOR OF THE COWLINGS OF A TURBOJET ENGINE THRUST INVERTER

TECHNICAL FIELD

The present invention relates to a system and a method for controlling at least one actuator of cowlings of a thrust reverser for a turbojet engine.

BACKGROUND

The role of a thrust reverser when an airplane comes in to land is to improve the ability of an airplane to brake by redirecting forward at least some of the thrust generated by the turbojet engine. During this phase, the reverser blocks off the gas jet pipe nozzle and directs the stream ejected from the engine toward the front of the nacelle, thereby generating a reverse thrust which adds to the braking of the airplane wheels.

The means employed to achieve this reorientation of the flow vary according to the type of reverser. However, in all cases, the structure of a reverser comprises movable cowlings that can be moved between, on the one hand, a deployed position in which they open up within the nacelle passage intended for the deflected flow and, on the other hand, a retracted position in which they close off this passage. These moving cowlings may also perform a deflecting function or may simply activate other deflecting means.

In cascade-type thrust reversers, for example, the moving cowlings slide along the rails so that by moving back during the opening phase, they uncover cascades of deflection vanes located within the thickness of the nacelle. A system of link rods connects this moving cowling to blocking doors which deploy into the ejection duct and block the exit as a direct flow. In door-type reversers on the other hand, each moving cowling pivots so that it blocks the flow and deflects it and therefore takes an active part in this reorientation.

In general, these moving cowlings are actuated by hydraulic or pneumatic actuating cylinders which require a network for transporting any pressurized fluid. This pressurized fluid is conventionally obtained either by bleeding off the turbojet engine, in case of a pneumatic system, or by tapping off the hydraulic circuit of the airplane. Such systems require significant maintenance because the smallest leak in the hydraulic or pneumatic network will be difficult to detect and carry the risk of having consequences that are damaging both to the reverse and to other parts of the nacelle. Furthermore, because of the small amount of space available in the forward section of the reverser, installing and protecting such a circuit are particularly tricky and cumbersome.

To alleviate the various disadvantages associated with the pneumatic and hydraulic systems, thrust reverser manufacturers have sought to replace them and to fit as many as possible of their reversers with electromechanical actuators which are more lightweight and more reliable. A thrust reverser such as this is described in document EP 0 843 089.

However, electromechanical actuators also have a number of disadvantages that need to be overcome in order to take full advantage of the benefits they provide in terms of weight saving and smaller size.

In particular, electromechanical actuators entail the use of a complete electrical system comprising the actuators, power and control components, and sensors, it being possible for all of these components to exhibit failures.

It is standard practice, in the event of a failure of one of the components of this system, to make the system unavailable, since the thrust reverser cannot be used at the level of performance required by its specifications.

BRIEF SUMMARY

The disclosure seeks to reduce the frequency of instances of unavailability of the system.

To this end, the invention provides a system for controlling at least one cowling actuator of a thrust reverser for a turbojet engine comprising a set of actuating and/or checking components comprising at least:
  at least one cowling actuator driven by at least one electric motor,
  control means for controlling the actuator and the electric motor,
  means of communication between the control means and an aircraft control system,
characterized in that
the control means are designed to detect a failure of an actuating and/or control component, to determine whether the failure does or does not disable the operation of the system and, if the failure is not a disabling one, to switch from a normal mode of operation to a failure-accommodating mode of operation in which the failure of the actuating and/or control component is at least partially compensated by a modified command of the other actuating and/or control components.

Thanks to the arrangements according to the invention, the system can be reconfigured in real time and continue to operate when the detected failure is not disabling in respect of the function concerned.

Taking the status of the system into consideration in order to actuate the reverser means that it can be actuated in a degraded mode, preserving the user safety of the system when the detected failure is not a disabling one.

These arrangements therefore make it possible to improve the availability of the system and therefore of the electrically actuated reverser.

Advantageously, the system comprises at least one position sensor sensing the position of a reverser cowling or the position of an actuator of a reverser cowling used to provide feedback control to the actuators. When the sensor or sensors is or are in failure, the control means carry out a modified command by lowering the torque and/or the speed of the motor.

These arrangements make the opening and closing of the reverser slower, but do allow it to be used in spite of the sensor failure.

Low-speed actuation avoids damage to the structure in the absence of position information.

Advantageously, the control means detect the end of travel of the cowling by an increase in motor torque and/or an increase in motor current.

According to one embodiment, in the event of a partial failure of the electrical power supply to the system or of a power stage of the system, the control means carry out a modified command of the motor to reduce the motor current so as not to exceed a limiting current liable to cause a break in the power supply.

These arrangements make the opening and closing of the reverser slower, but do allow it to be used in spite of the power supply failure.

According to one embodiment, in the event of a failure of the motor, the control means carry out a modified command in order to open the reverser, this comprising unlocking at least one latch of the cowling, the cowling opening through an aerodynamic effect.

Advantageously, the control means detect the direction of travel of the actuator and/or the cowling under the effect of aerodynamic forces in order to block movement in the direction of closure by the motor brake.

According to one embodiment, the system comprises warning means for alerting a user when the system is in failure-accommodating mode of operation.

These arrangements allow a user, for example the pilot, to be alerted to the fact that the performance of the reverser will be slightly degraded.

Another subject of the present invention is a method for controlling at least one actuator of cowlings of a thrust reverser, comprising the steps comprising:
- detecting a failure in an actuator control system,
- determining whether the failure is disabling or not disabling,
- choosing a failure-accommodating mode on the basis of the type of non-disabling failure detected, in the event that the failure is not disabling,
- applying the chosen failure-accommodating mode.

BRIEF DESCRIPTION OF THE DRAWINGS

In any event, the invention will be clearly understood with the aid of the description which follows, with reference to the attached schematic drawing which, by way of non-limiting example, depicts one embodiment of this system.

DETAILED DESCRIPTION

Before describing one embodiment of the invention in detail, it is important to emphasize that neither the method nor the system described is limited to one type of thrust reverser in particular. Although illustrated in the form of a cascade-type thrust reverser, the invention may be implemented with thrust reversers of different designs, particularly of the doors design.

Figure 1:
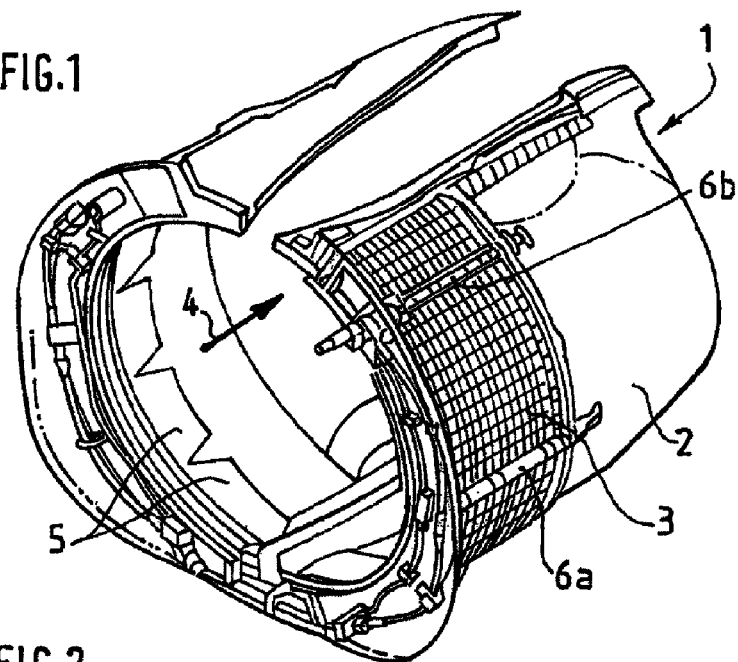
FIG. 1 is a partial and perspective schematic view of a nacelle incorporating a cascade-type thrust reverser.

FIG. 1 shows a partial schematic view of a nacelle incorporating a thrust reversal 1. The turbojet engine is not depicted. This thrust reverser 1 has a structure comprising two semicircular moving cowlings 2 able to slide to uncover cascades 3 of deflection vanes positioned between the moving cowlings 2 and a passage cross section for the flow of air 4 that is to be deflected. Blocking doors 5 are positioned inside the structure so that they can pivot and move from a position in which they do not impede the passage of the airflow 4 into a position in which they block this passage. To coordinate the opening of the moving cowlings 2 with a closing-off position of the blocking doors 5, the latter are mechanically linked to the moving cowling 2 by hinges and to the fixed structure by a system of linkages (not depicted).

The movement of the moving cowling 2 along the outside of the structure is afforded by a set of actuating cylinders 6a, 6b which are mounted on a forward section inside which are housed an electric motor 7 and flexible transmission shafts 8a, 8b connected respectively to the actuating cylinders 6a, 6b in order to actuate them.

Figure 2:
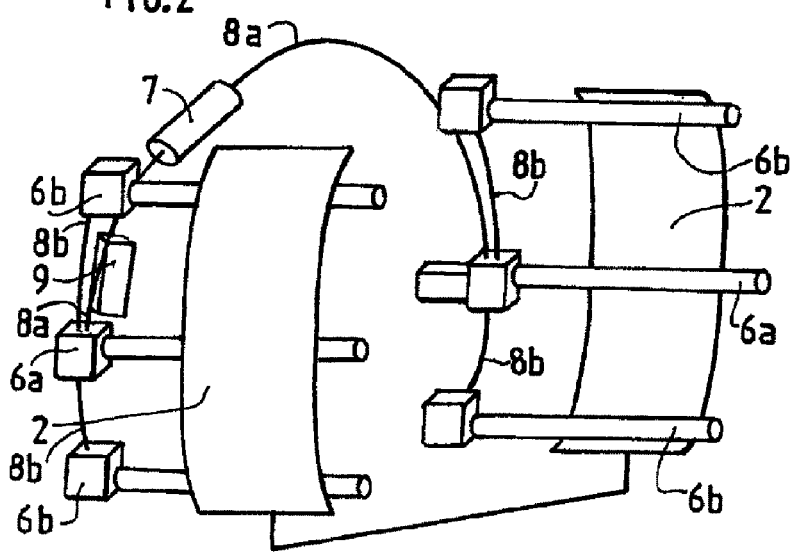
FIG. 2 is a schematic depiction of the moving cowlings and of their actuating system.

The system for actuating the moving cowlings 2 is depicted in isolation in FIG. 2. Each moving cowling 2 may undergo a translational movement under the action of three actuating cylinders 6a, 6b, comprising a central actuating cylinder 6a and two additional actuating cylinders 6b actuated by a single electric motor 7 connected to control means 9 comprising a microcontroller. The power delivered by the electric motor 7 is first of all distributed to the central actuating cylinders 6a via two flexible transmission shafts 8a, then to the additional actuating cylinder 6b via flexible transmission shafts 8b.

According to an alternative form that has not been depicted, only two top and bottom actuating cylinders are used for each cowling, these being actuated by a single electric motor connected to a control interface. The powder delivered by the electric motor is distributed to the two top and bottom actuating cylinders via two flexible transmission shafts 8a.

Figure 3:
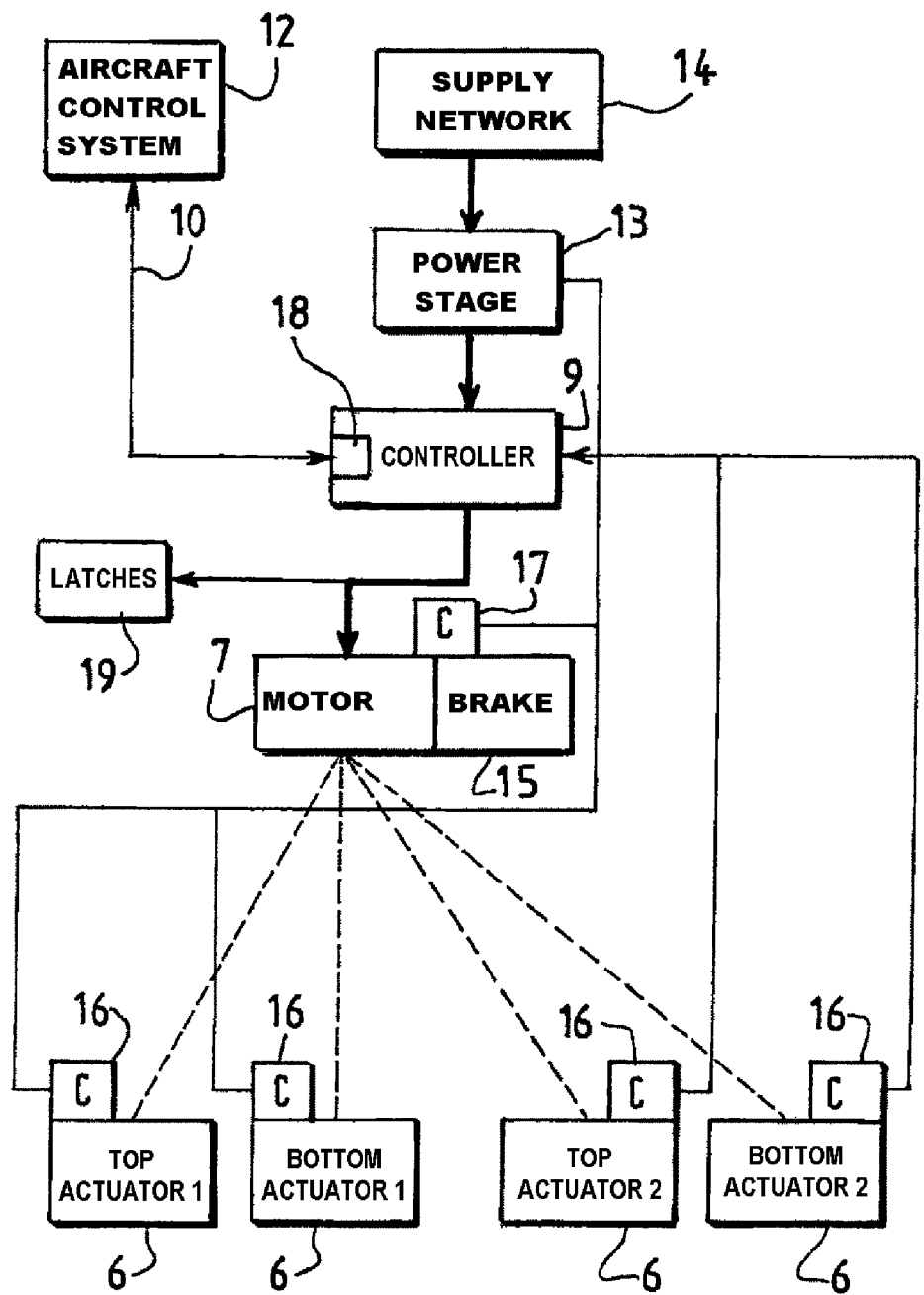
FIG. 3 is a schematic depiction of the control system used to control the actuators of the moving cowlings.
Figure 4:
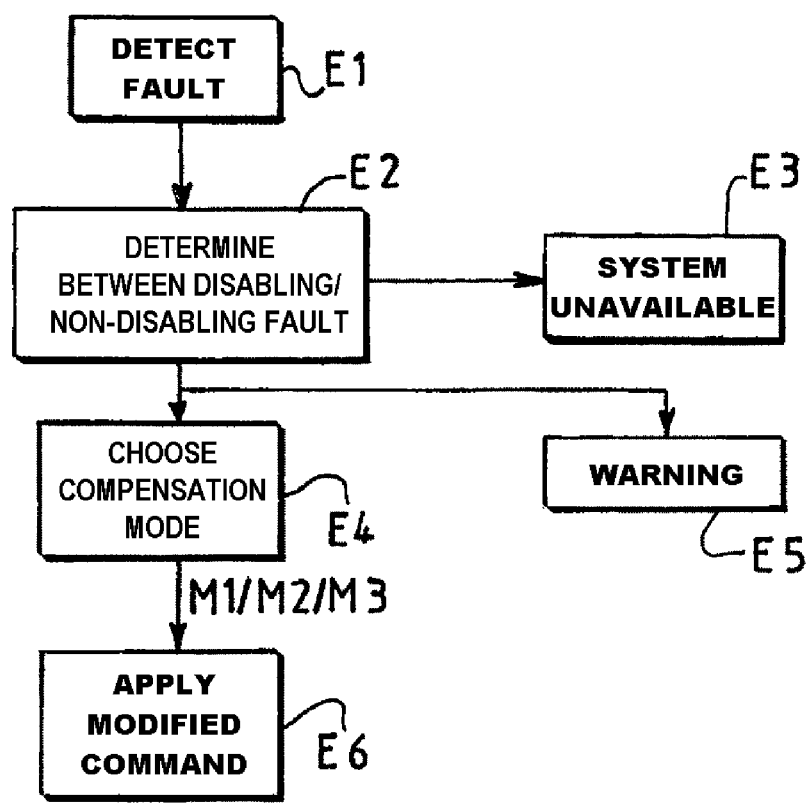
FIG. 4 is a flow diagram of a method according to the invention.

FIG. 3 schematically shows a system for controlling the actuation of two cowlings with two top and bottom actuators for each cowling.

As has been depicted in FIG. 3, a system for controlling the actuators of the thrust reverser according to the invention comprises control means comprising a microcontroller 9.

This microcontroller is connected by communication means 10 to the aircraft control system 12.

The control system also comprises a power stage 13 connected to the aircraft supply network 14.

The microcontroller 9 allows an electric motor 7 and actuating cylinders or actuators 6 to be controlled, as described earlier. The motor also comprises a brake 15, likewise controlled by the microcontroller 9.

Some of the actuators 6 are equipped with position sensors 16 so as to determine the movement of the actuator 6 between the open and closed position. Likewise, the motor and/or the brake are equipped with position sensors 17 which likewise allow the direction in which the actuator 6, and therefore the cowling 2, are moving to be determined.

The system also comprises means of alerting a user when the system is in a failure-accommodating mode of operation as described hereinbelow, these means comprising a simple interface 18, using the means 10 of communicating with the aircraft control system 12 which itself alerts the pilot.

The microcontroller 9 also controls the opening and closing of a cowling latch 19, known as the primary latch. This latch prevents undesired opening of the cowling 2.

The microcontroller 9 is designed to detect a failure of an actuating and/or control component, to determine whether the failure does or does not disable the operation of the system and, if the failure is not a disabling one, to switch from a normal mode of operation to a failure-accommodating mode of operation in which the failure of the component is at least partially compensated by a modified command of the other actuating and/or control components.

The main types of failure that may arise in the system and be compensated for by switching to a failure-accommodating mode are failures of the sensor 17, 16, failures of the motor 7, or partial failures of the power supply.

A first failure-accommodating mode M1 relates to a failure of the position sensors 16 that sense the position of a reverser cowling 2.

The information concerning the position of the cowling 2 is used to provide feedback control of the actuator. In particular, the speed of opening or of closing can vary according to the position of the cowling 2, the speed decreasing as the limit stop is neared.

In the event of a failure and therefore in the event of an absence of information regarding the position of the cowling 2, in the failure-accommodating mode M1, the microcontroller 9 carries out a modified command by lowering the torque and/or the speed of the motor 7 and by detecting the end of travel through an increase in the motor torque and/or an increase in the motor current.

A second failure-accommodating mode M2 relates to a partial failure of the power stage 13 or to a partial failure of the power supply network 14. In particular, one known failure is the loss of one of the phases of the three-phase power supply.

When this happens, the microcontroller 9 carries out a modified command of the motor 7 on two phases, reducing the torque of the motor 7 and therefore the intensity of the current drawn by the motor 7 so as not to exceed a limiting current liable to cause a break in the power supply 14.

Specifically, the power supply network 14 has a safety device, known as a breaker, which cuts the power supply when too strong a current is demanded by a load connected to this power supply.

A third failure-accommodating mode M3 relates to a failure of the motor.

When this happens, the microcontroller 9 carries out a modified command to open the reverser cowling 2, this comprising unlocking at least one latch 19 of the cowling and allowing the motor 7 to "free wheel", that is to say deactivating the motor brake 15. The aerodynamic effects in this case cause the reverser cowling 2 to open.

The microcontroller 9 detects the direction of travel of the actuator and/or of the cowling under the effect of the aerodynamic forces in order to block the movement in the direction of a closing by the brake 15 of the motor if such a movement is detected.

A diagram summarizing the steps of a method according to the invention is depicted in FIG. 3.

In a first step E1, a failure in the system is detected. In a second step E2, the failure is categorized as disabling or not disabling. If the failure is a disabling failure, the system signals its unavailability in a third step E3.

If not, a failure-accommodating mode M1, M2, M3 is chosen in a fourth step E4 on the basis of the type of non-disabling failure detected.

In a final step E5, the failure-accommodating mode M1, M2, M3 is applied.

It should be noted that the control method described hereinabove may be programmed into the computer using software means.

As goes without saying, the invention is not restricted only to the embodiment of the system that has been described hereinabove by way of example, but on the contrary encompasses all variants thereof.

The invention claimed is:

1. A system for controlling at least one actuator of cowlings of a thrust reverser for a turbojet engine, said system comprising a set of actuating and/or checking components of the at least one actuator, the set of actuating and/or checking components comprising:
   at least one electric motor to drive the at least one actuator;
   control means for controlling the at least one actuator and the at least one electric motor;
   means of communication between the control means and an aircraft control system; and
   at least one position sensor sensing a position of the cowlings of the thrust reverser or a position of the at least one actuator used to provide feedback control of the at least one actuator,
   wherein the control means are configured to detect a failure of a component of the set of actuating and/or control components, and the control means are configured to determine whether the failure of the component does or does not disable the operation of the system,
   wherein if the failure of the component is not a disabling one, the control means are configured to switch from a normal mode of the operation of the system to failure accommodating modes of the operation of the system, and the failure-accommodating modes comprise first, second and third failure-accommodating modes in which the failure of said at least one position sensor, said at least one electric motor, and an electrical power supply to the system or of a power stage of the system is at least partially compensated by a modified command of other component of the set, so that when the at least one position sensor is in failure but does not disable the operation of the system, the control means are configured to carry out the first failure accommodating mode in which a modified command lowers a torque and/or a speed of the at least one electric motor, and detects an end of travel of the cowling through an increase in the motor torque and/or an increase in the motor current,
   wherein in an event of a partial failure of the electrical power supply to the system or of the power stage of the system, the control means are configured to carry out the second failure-accommodating mode in which a modified command of the at least one electric motor reduces motor current below a limiting current liable to cause a break in the electrical power supply,
   wherein in an event of a partial failure of said at least one electric motor, the control means are configure to carry out the third failure-accommodating mode in which the controller deactivates a motor brake and detects a direction of travel of said at least one actuator and/or of the cowls under an effect of an aerodynamic forces.

2. The system as claimed in claim 1, wherein in an event of a failure of the at least one electric motor, the control means are configured to carry out a modified command in order to open the cowlings of the thrust reverser, the modified command comprising unlocking at least one latch of the cowlings.

3. The system as claimed in claim 2, wherein the control means are configured to detect direction of travel of the at least one actuator and/or the cowlings of the thrust reverser under effect of aerodynamic forces in order to block movement in a direction of closure by a motor brake.

4. The system as claimed in claim 1, further comprising warning means for alerting a user when the system is in failure-accommodating mode of operation.

5. A method for controlling a system for controlling at least one actuator of cowlings of a thrust reverser for a turbojet engine according to claim 1, the method comprising:
   detecting a failure of a component of the set of actuating and/or checking components of the actuator control system comprising the at least one position sensor configured to sense the position of a reverser cowling or the position of an actuator of the cowlings of a thrust reverser;

determining whether the failure of the component of the set is disabling or not disabling the operation of the system;

choosing a failure-accommodating mode when the failure is not disabling the operation of the system, so that when the at least one position sensor is in failure, the control means configured to carry out a modified command by lowering a torque and/or a speed of the at least one electric motor; and applying the chosen failure-accommodating mode.

6. The method as claimed in claim 5, further comprising alerting a user when the system is in the failure-accommodating mode.

* * * * *